(12) United States Patent
Sussmann et al.

(10) Patent No.: US 6,708,427 B2
(45) Date of Patent: Mar. 23, 2004

(54) SOLE IN THE FORM OF A MIDSOLE, INNER SOLE OR INSERTABLE SOLE FOR A SHOE AND A SHOE WITH SAID SOLE

(75) Inventors: Reinhold Sussmann, Scheinfeld (DE); Horst Widmann, Schwaig (DE)

(73) Assignee: Puma Aktiengesellschaft Rudolf Dassler Sport, Herzogenaurach (DE)

( * ) Notice: Subject to any disclaimer, the term of this patent is extended or adjusted under 35 U.S.C. 154(b) by 89 days.

(21) Appl. No.: 10/069,457

(22) PCT Filed: Jun. 22, 2001

(86) PCT No.: PCT/DE01/02272

§ 371 (c)(1),
(2), (4) Date: Feb. 26, 2002

(87) PCT Pub. No.: WO02/00051

PCT Pub. Date: Jan. 3, 2002

(65) Prior Publication Data

US 2002/0112379 A1 Aug. 22, 2002

(30) Foreign Application Priority Data

Jun. 26, 2000 (DE) ........................... 200 10 794 U

(51) Int. Cl.[7] ............................. A43B 5/02; A43B 7/14
(52) U.S. Cl. .................. 36/128; 36/88; 36/107
(58) Field of Search .................... 36/43, 44, 128, 36/88, 107, 108, 117.5, 118.2, 142, 143, 144

(56) References Cited

U.S. PATENT DOCUMENTS

| 4,879,821 A | * | 11/1989 | Graham et al. ................. 36/44 |
| 5,467,537 A | * | 11/1995 | Aveni et al. .................. 36/50.1 |
| 5,901,469 A | * | 5/1999 | Saillet ........................ 36/118.2 |
| 5,966,843 A | * | 10/1999 | Sand et al. .................. 36/117.1 |
| 6,151,804 A | * | 11/2000 | Hieblinger ..................... 36/128 |
| 6,282,816 B1 | * | 9/2001 | Rosendahl ...................... 36/44 |
| 6,321,469 B1 | * | 11/2001 | Cretinon ....................... 36/102 |
| 6,408,543 B1 | * | 6/2002 | Erickson et al. ............... 36/100 |
| 6,497,058 B2 | * | 12/2002 | Dietrich et al. ................ 36/69 |

FOREIGN PATENT DOCUMENTS

| DE | 349241 | 2/1922 |
| DE | 32 19 652 C2 | 12/1983 |
| DE | G 92 03 446 U1 | 6/1992 |
| DE | 197 08 113 A1 | 9/1998 |
| DE | 197 16 666 A1 | 10/1998 |
| DE | 196 01 219 C1 | 11/2000 |

* cited by examiner

Primary Examiner—M. D. Patterson
(74) Attorney, Agent, or Firm—Nixon Peabody LLP; David S. Safran

(57) ABSTRACT

The invention concerns a sole, used as a throughsole, inner sole or insole for a shoe, e.g., a football boot with a flexible outsole. The sole ensures that when shooting on the volley in football or with similar loadings, the entire force can be transmitted to the ball or similar sports equipment by means of a special stiffening of the sole by tension elements attached to raised walls of the edge area of the sole.

28 Claims, 2 Drawing Sheets

SOLE IN THE FORM OF A MIDSOLE, INNER SOLE OR INSERTABLE SOLE FOR A SHOE AND A SHOE WITH SAID SOLE

BACKGROUND OF THE INVENTION

1. Field of the Invention

The present invention relates to a sole embodied as a throughsole, inner sole or insole for a shoe with a flexible outsole and relates to a shoe with such a sole.

2. Description of Related Art

In providing shoes with a flexible outsole, it is known for the outsole to bend in the shape of an arch of a bridge or an archway under certain loading conditions. This happens, for example, when playing football when shooting on the volley. In this instance, the ball is struck in such a way that, with shoes with a soft flexible outsole, the front part of the foot together with the front part of the shoe is bent downwards due to the yielding nature of the outsole. Thus, in the shooting process, the sole is bent downwards at the front end so that the force cannot be transmitted completely to the ball when shooting.

A shoe which is stiffened against the bending discussed above is shown in the German patent 196 01 219 C1. The stiffening is achieved by providing a front tension band connecting the front end of the sole to the upper and two rear lateral tension bands connecting the heel area of the sole to the upper. The front tension band and the two rear tension bands are connected to one another in the instep area. In addition, the connecting node of the three bands can be fixed by a further tension band running transversely from one side of the shoe to the other. This prevents the front part of the shoe from bending downwards, but does not stop the sole rolling. The force occurring when under loading in the bending direction is borne by the instep.

This is an undesirable situation and results painful loading of the instep area as several tendons run in this area. In addition, this design does not prevent a soft flexible shoe sole from bending upwards in the area of the arch of the foot and subjecting the foot to extremely painful loading when impinging on hard and/or frozen objects.

SUMMARY OF THE INVENTION

The object of the invention is to prevent the undesired bending or flexing of the shoe and the loading on the foot in the area of the instep and the arch of the foot.

This object is achieved through the use of resiliently elastic material along with raised side areas and tension element or elements attached to them in their upper edge area to ensure that all the above discussed types of loading are borne by the sole of the invention as a throughsole, inner sole or insole so that painful loading force is no longer transmitted to the foot.

DETAILED DESCRIPTION OF THE INVENTION

Figure 1:
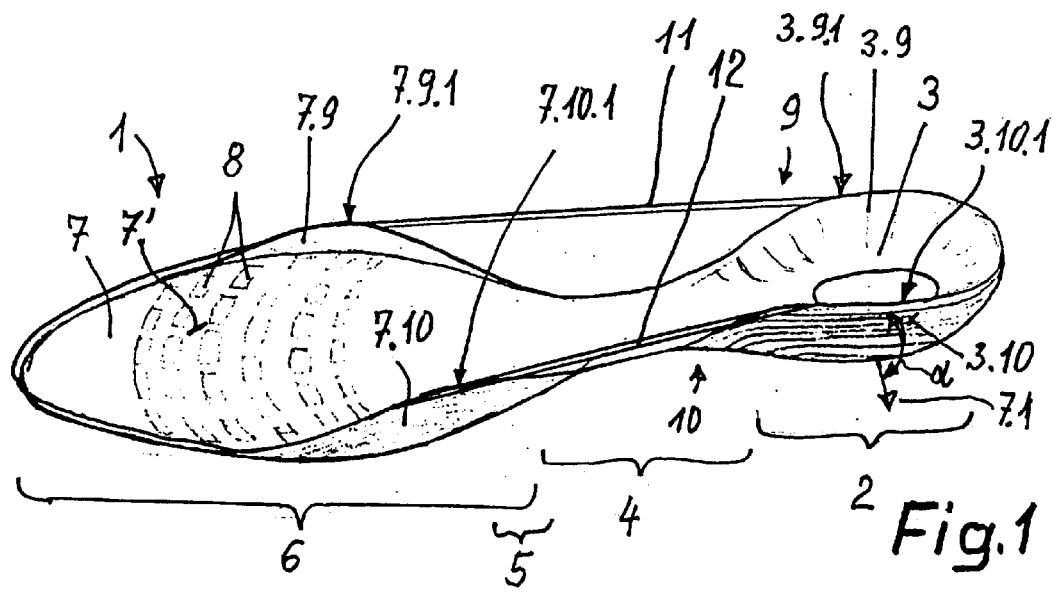
FIG. 1 illustrates a perspective view of the sole according to the invention.

A sole embodied as a throughsole, inner sole or insole is denoted by 1. It is made of a resiliently elastic, flexible material, for example a thermoplastic or duroplastic, such as polyamide, polyurethane, polyethylene or the like.

In particular, the sole 1 is made of a long-fiber material with a high tensile strength, such as glass fibers, carbon fibers, aramide fibers, or plastic fibers made of or based upon polyamide, aramide or the like, or of textile fibers which are mixed and/or coated for example with a thermoplastic or duroplastic bonding material and produced by a thermal process, in particular a thermal and pressing process, and are possibly molded, for example at the same time as the sole 1.

Manufacture of the sole 1 can be by the method shown in DE 197 16 666 A1 the disclosure of which is hereby incorporated by reference. Thus, for example, the pattern to be pressed is produced on an automatic stitching machine, where an endless strand of carbon fibers and/or glass fibers and/or aramide fibers are mixed with thermoplastically deformable plastic powder and wound on a reel, is laid on a carrier material and secured roughly with zigzag stitches so that the strand adheres to the carrier in a desired, calculated position. The carrier material can be a textile material or a plastic material, for example in the form of a woven or knitted fabric or a plastic film or a fiber mat. The quantity of threads or fibers and/or the pattern, i.e., the geometric configuration, and the spacings of one or more strands, depends on the previously defined and calculated properties of the finished sole. After completion of the "stitching, the two-dimensional, i.e., flat, mats thus obtained are transformed into a three-dimensional structure by means of heat, e.g. 230° C. to 260° C., and by means of a defined molding tool. In the process, the plastic powder (microgranulate) contained in the strands melts and solidifies in the desired form as it cools. When the plastic melts, it combines with the fibers of the strand and achieves the stiffening effect when it cools, similar to a synthetic resin in composite materials. During this process, the carrier material also melts and residues which may be protruding are removed when the sole is processed further.

However, the sole 1 can also be produced by other methods, for example, by a direct injection or an injection molding process, a stamping process or the like. The material for the sole 1 can preferably be transparent or translucent. At least one of its surfaces can be smooth, polished or roughened.

The sole 1 is made of resilient elastic in the heel area 2 from the heel cup 3 to the area 4 of the arch of the foot, in particular a web area, and to the ball area 5 of the ball of the foot, that is, roughly to the start of the front sole area 6 of the front of the sole 7, but the sole is made rigid so that it can barely be bent at all under normal loading. This rigidity is determined by the material thickness and the choice of the material for the fibers and the bonding material. On the other hand, the ball area 5 and the front of the sole 7 are adjusted so that they can be bent in a resilient elastic manner by an appropriate choice of the thickness of the material and possibly by providing openings 8.

Both the heel area 2 or the heel cup 3 and the front part of the sole 7 are provided with edges in the form of walls raised approximately 0.5 cm to 2 cm vertically or obliquely outwards on both sides 9, 10. Here, the sole 1 is preferably matched to the contour of a foot. The bottom 7' of the front part of the sole 7 can be curved outwards slightly, i.e., curved downwards slightly. The angle of the walls can be roughly 45° to roughly 80°, measured as external angle α in relation to the plane 7.1 of the front part of the sole 7. These raised walls 3.9 and 7.9 of the heel or heel cup 3 and the front part of the sole 7 on one side 9 and the corresponding walls 3.10 and 7.10 on the other side 10 thereof are in each case connected together by a tension element 11 or 12 of high tensile strength and minimal elastic elongation in the upper edge area 3.9.1 and 3.10.1 of the heel cup 3 and 7.9.1 and 7.10.1 of the front part of the sole 7. As a result, the front part of the sole 7 can no longer be bent downwards by a loading such as occurs for example when shooting on the volley, while playing football or when the wearer of the shoe treads on a raised object in the area of the arch of the foot. When this happens, no loading of any kind occurs on the instep of the wearer since the entire loading is borne by the tension elements 11, 12 and the sole 1 itself. The heel area 2 can be grasped peripherally by the tension elements 11 or 12.

The tension elements 11, 12 can be made of fibers, threads or at least one fiber strand. The materials can be plastic fibers, textile fibers, carbon fibers, glass fibers or aramide fibers. These can be mixed with a bonding material, for example a thermoplastic or duroplastic which connects the fibers, threads and/or fiber strands together in a hot molding process. This process can also be the method for connecting the tension element or elements 11, 12 to the edge of the raised walls. In addition, with an endless tension band, this can be connected, for example, to the peripheral edge of the sole 1, possibly with the exception of those areas in which the tension elements 11, 12 run freely. However, individual tension bands or the endless tension band can also only be partly attached to the edge and to another part on the bottom 7' of the front part of the sole 7 and/or the bottom of the heel or heel cup 3.

Preferably, the front part of the sole 7 is provided with a wall pointing upwards continuously from one side 9 around the point 13 to the other side 10, i.e., roughly shell-shaped. This produces additional stiffening which further assists the desired effect. Here, the raised edge or the raised wall in the ball area 5 can be higher than towards the front in the direction of the point 13. The bottom 7' of the front part of the sole 7 can be provided with at least one reinforcing bead 7.2. The bead, or beads, preferably run in the direction of the longitudinal axis of the sole 1 and are angled downwards.

Advantageously, the web area 4 is relatively narrow due to lateral curved recesses 14 and 15. The width of the web area 4 is advantageously roughly ⅛ to ¾ of the maximum width of the heel area 2 or heel cup 3. Through the recesses 14, 15, the tension elements 11, 12 in the area 4 of the arch of the foot run freely from one wall 3.9 or 3.10 to the other wall 7.9 or 7. 10, respectively. As a result, the foot is not covered by the hard sole 1 in the area of the arch of the foot and yet the front part of the sole 7 is prevented from bending downwards by the tension elements 11, 12. The heel cup 3 can exhibit an opening 3.1 in the area of impingement of the heel.

Figure 3:
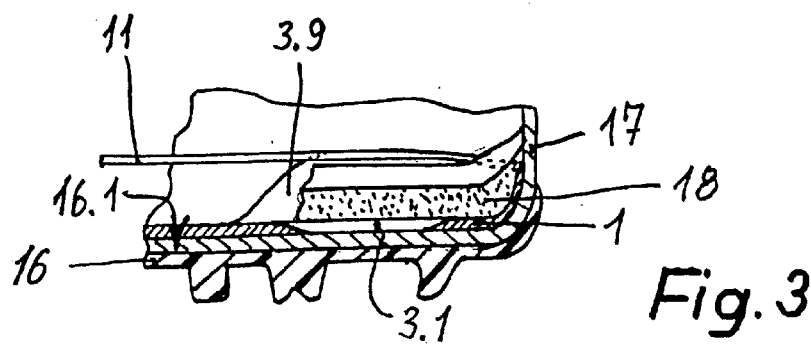
FIG. 3 illustrates a cross-section through a portion of a shoe with a sole of FIGS. 1 and 2.

FIG. 3 shows a section through a heel portion of a shoe 1. An upper material 17 is fastened, for example "strobeled", lasted and/or glued, on the inside 16.1 of a soft elastic flexible outsole 16. The sole 1 is laid on this upper material 17 and connected firmly, for example glued, to the latter, and the sole 1 is provided with a covering 18, connected firmly to the latter. The covering 18 can also be an insole. The covering 18 is preferably made of an elastically yielding material, for example, a foam material made of elastic or elastically adjusted plastic. A foamable thermoplastic or duroplastic can be used as the plastic. A plastic made of or based on polyamide, polyethylene, polyurethane or the like is suitable. Preferably, the covering 18 is matched to the shape of the foot. A sole 1, provided with a covering 18, can, as another embodiment, be manufactured as an insole, inserted into a shoe and secured in a shoe.

The sole 1 connected to a covering layer, for example the covering 18, or an insole or comfort sole, and can be laid loosely in the 'strobeled" shoe or be connected firmly to the latter. The sole 1 largely performs the functions of the usual sole base and the insole, such as for example flexibility, stability, torsional rigidity and the like, but with less weight than in the case of previously known embodiments.

Figure 2:
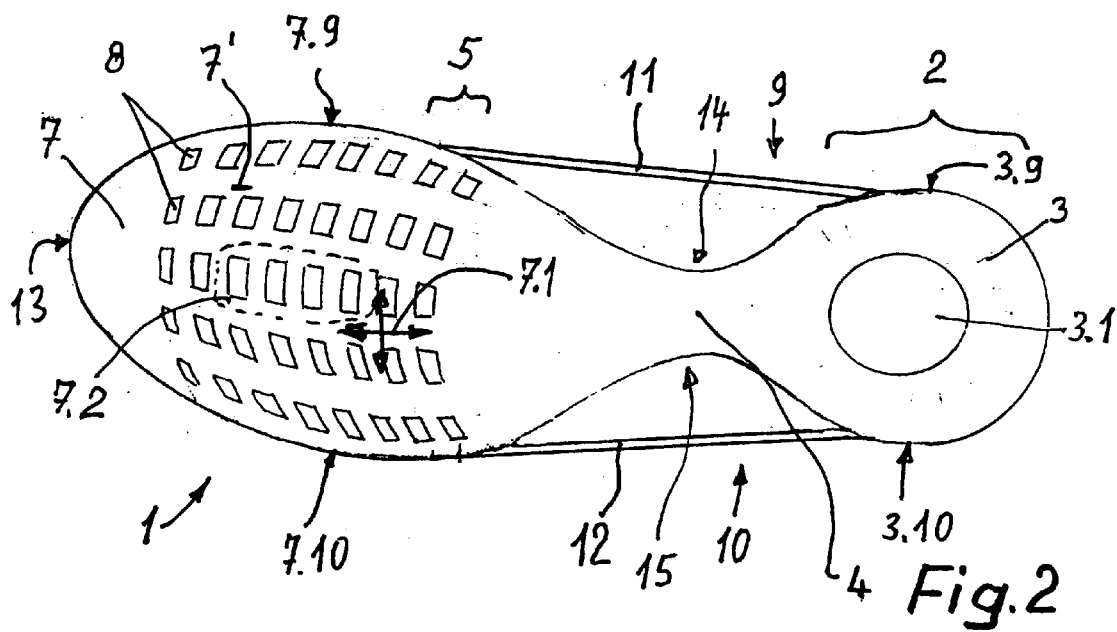
FIG. 2 illustrates a plan view of the sole in FIG. 1.
Figure 4:
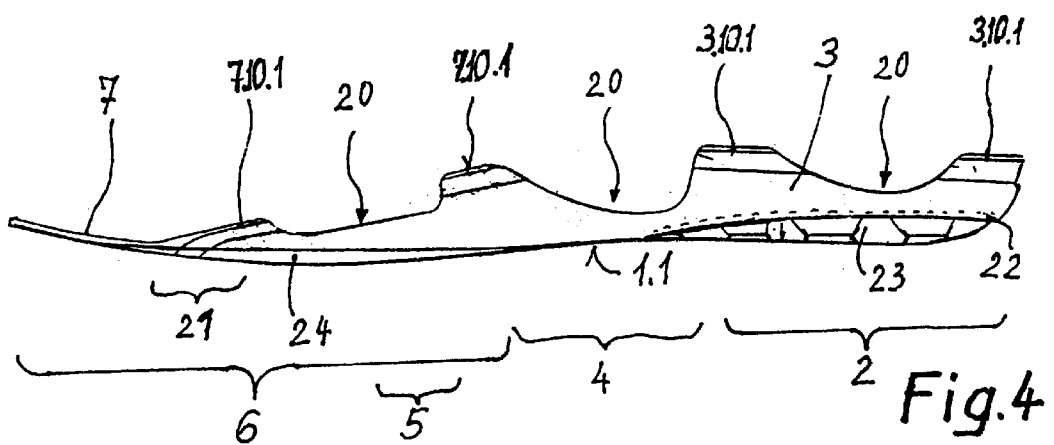
FIG. 4 illustrates a side view of a sole with a damping element in the heel area and a special guide for the tension elements.
Figure 5:
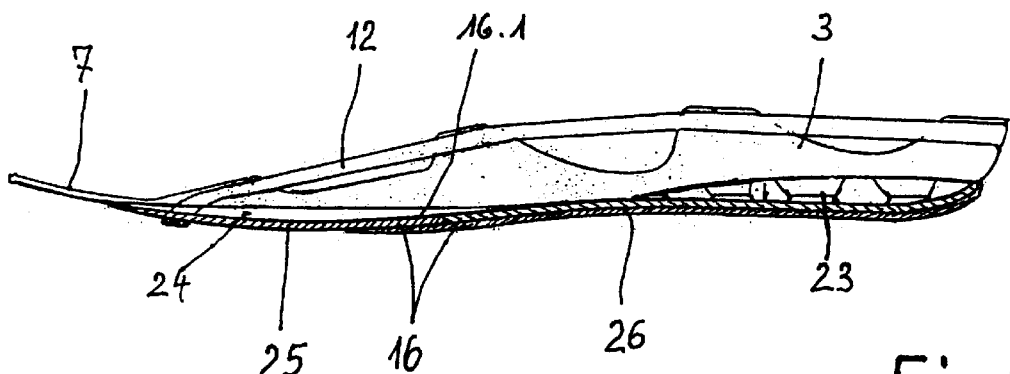
FIG. 5 illustrates the view according to FIG. 4 with an outsole illustrated in cross section.

In the embodiment illustrated in FIGS. 1 to 3, the tension elements 11, 12 or the endless tension element can be provided on the inside or on the outside of the walls 3.9, 3.10 and 7.9, 7.10, respectively. While, in the embodiment illustrated in FIGS. 4 and 5, grooves 3.10.1 and 7.10.1, in which the tension elements 11, 12 are laid and secured, i.e., glued, are provided in the walls 3.9, 3.10 and 7.9, 7.10 respectively (see FIG. 1). The grooves 3.10.1 and 7.10.1 can also be provided on the inside when the tension elements 11, 12 run along on the inside. The width of the groove roughly corresponds to the width of the tension elements 11, 12 and the depth of the grooves 3.10.1 and 7.10.1 is approximately 0.2 mm to 0.5 mm. Preferably, at least one lower section 20 can be provided between the walls 3.9, 3.10 and/or 7.9. 7.10, and then the tension elements 11, 12 are freely stretched between them. The tension elements 11, 12 need not be guided around the point of the front part of the sole 7, as illustrated in FIGS. 1 to 3. It is sufficient, and may even be advantageous, if the tension elements 11, 12 end in front of or in the area 21 of the toe basal joints and are passed through transversely under the sole 1, as shown in FIG. 5. Then, there is no need to provide a raised wall in the area of the point of the front end of the sole 7, as shown in FIGS. 4 and 5. In addition, the tension elements 11 and 12 coming from the front part of the sole 7 can be passed transversely under the sole 1 after the ball area 6 or in the area 4 of the arch of the foot.

Advantageously, a damping element 23 is provided, preferably on the underside 1.1 of the sole 1 or in a recess 22 of the sole 1 or in the opening 3.1 of the heel cup 3, and connected firmly, i.e., glued, to the material of the sole 1 or molded with the sole 1 when it is produced. Preferably, the damping element 23 is a honeycomb structure. Advantageously, the surface of the sole 1, made of transparent or translucent material, is smooth or glossy above the damping element 23 so that the structure of the damping element 23 is visible.

With soles 1 provided for shoes which are not exposed to particularly high loadings of the kind discussed previously, it may be sufficient if the tension elements 11, 12 are only present in the area of the front of the foot 6 and only extend from the area 21 of the toe basal joints towards the rear. These can then run transversely over the underside 1.1 of the sole 1 in the area 21 of the toe basal joints and/or in the area 4 of the arch of the foot, in particular in its starting area or the end area of the ball area 6, and be secured to the sole 1.

According to another embodiment of the invention, a reinforcing part 25 can be attached to the sole 1, in particular to the underside 1.1 and preferably in a shallow recess 24. This reinforcing part is made of plastic or fiber-reinforced material, in particular with glass fibers, carbon fibers, plastic fibers, textile fibers, possibly along with a bonding material of a thermoplastic or duroplastic. Preferably, the reinforcing part 25 is a curved molding with no interruptions or openings.

Preferably, the sole 1 according to the invention can be used in shoes in which the upper material 17 is attached and secured on the inside 16.1 of the outsole 16, and the sole 1 of the invention is attached firmly as a throughsole to the upper material 17 while remaining free of the inside 16.1 of the outsole. An insole or covering 18 is then provided on the sole 1 and connected firmly to the sole 1.

The sole 1 according to the invention is particularly suitable for football boots, and shoes or boots for American football, cricket, baseball, and also for golf shoes or the like.

What is claimed is:

1. A sole for a shoe constructed from a material having resiliently elastic properties, the sole being flexible in a direction extending lengthwise of the sole from a heel area through an arch area to a ball area while being rigid in the ball area and in a front sole area in a direction transverse to the longitudinal direction of the sole,
   wherein the front sole area is shell-shaped, and sides of the sole at least in the ball area and the heel area are raised to form walls, wherein the walls have a height of 0.5 cm to 2.0 cm on each side of the sole, wherein at least one substantially unstretchable, tension element is connected to an upper portion of each of the walls and runs freely between the walls.

2. A sole as set forth in claim 1, wherein the at least one tension element extends peripherally around the heel area of the sole.

3. A sole as set forth in claim 1, wherein the sole has a side recess on each side of the sole extending from the heel area to the front sole area to form a narrowing in a horizontal plane of the sole.

4. A sole as set forth in claim 1, wherein the narrowing has a width area which is approximately ⅕ to ¾ of the maximum width of the heel area.

5. A sole as set forth in claim 1, wherein the at least one tension element comprises fiber strands selected from the group consisting of glass fibers, carbon fibers, plastic fibers and textile fibers, and said fibers coated or molded with a bonding material selected from the group consisting of a thermoplastic or duroplastic.

6. A sole as set forth in claim 1, wherein in the front sole area the at least one tension element extends from a position in the ball area in a basal joint area of a wearer's toes toward the heel area.

7. A sole as set forth in claim 1, wherein the at least one tension element is integrally bonded to the walls.

8. A sole for a shoe constructed from a material having resiliently elastic properties, the sole being flexible in a direction extending lengthwise of the sole from a heel area through an arch area to a ball area while being rigid in the ball area and in a front sole area in a direction transverse to the longitudinal direction of the sole,
   wherein the front sole area in front of the ball area, and sides of the sole at least in the ball area, the arch area and the heel area are raised to form walls, wherein the walls have a height of 0.5 cm to 2.0 cm on each side of the sole, wherein at least one substantially unstretchable, tension element is connected to an upper portion of each of the walls and runs freely between the walls.

9. A sole as set forth in claim 8, wherein the at least one tension element extends peripherally around the heel area of the sole.

10. A sole as set forth in claim 8, wherein between the walls of at least the front sole area and the heel area is at least one lower section such that the at least one tension element extends across the at least one lower section.

11. A sole as set forth in claim 8, wherein the walls of the front sole area are higher in the ball area than in the remaining front sole area.

12. A sole as set forth in claim 8, wherein the walls of the front sole area and the heel area are angled upwards and outwards to match the shape of a foot.

13. A sole as set forth in claim 8, wherein a external angle α of the walls relative to a horizontal plane of the sole is approximately 45° to 80°.

14. A sole as set forth in claim 8, wherein the sole has a side recess on each side of the sole extending from the heel area to the front sole area to form a narrowing in a horizontal plane of the sole.

15. A sole as set forth in claim 8, wherein the narrowing has a width area which is approximately ⅕ to ¾ of the maximum width of the heel area.

16. A sole as set forth in claim 8, wherein the front sole area contains a plurality of openings.

17. A sole as set forth in claim 8, wherein the heel area has an opening In the area of impact of the heel.

18. A sole as set forth in claim 17, wherein a resilient and elastic cushion is secured within the opening.

19. A sole as set forth in claim 8, wherein the heel area is provided on an underside with a damping element.

20. A sole as set forth in claim 19, wherein the damping element is of a honeycomb structure.

21. A sole as set forth in claim 8, wherein the at least one tension element comprises fiber strands selected from the group consisting of glass fibers, carbon fibers, plastic fibers and textile fibers, and said fibers coated or molded with a bonding material selected from the group consisting of a thermoplastic or duroplastic.

22. A sole as set forth in claim 21, wherein the at least one tension element comprises aramide fibers.

23. A sole as set forth in claim 8, wherein the at least one tension element extends from the front sole area to the beginning of the arch area.

24. A sole as set forth in claim 8, wherein the at least one tension element is an endless peripheral strand which extends transversely across one of the front sole area and the arch area, and around the heel area.

25. A sole as set forth in claim 8, wherein the at least one tension element extends from the front sole area to the middle of the arch area.

26. A sole as set forth in claim 8, wherein the at least one tension element is integrally bonded to the walls.

27. A sole for a shoe constructed from a material having resiliently elastic properties, the sole being flexible in a direction extending lengthwise of the sole from a heel area through an arch area to a ball area while being rigid in the ball area and in a front sole area in a direction transverse to the longitudinal direction of the sole,
   wherein the front sole area is shell-shaped, and sides of the sole at least in the ball area and the heel area are raised to form walls, wherein at least one substantially unstretchable, tension element is connected to an upper portion of each of the walls, and wherein the at least one tension element is an endless peripheral strand which extends across each upper portion of the walls.

28. A sole for a shoe constructed from a material having resiliently elastic properties, the sole being flexible in a direction extending lengthwise of the sole from a heel area through an arch area to a ball area while being rigid in the ball area and in a front sole area in a direction transverse to the longitudinal direction of the sole,
   wherein the front sole area in front of the ball area, and sides of the sole at least in the ball area, the arch area and the heel area are raised to form walls, wherein at least one substantially unstretchable, tension element is connected to an upper portion of each of the walls, and wherein the at least one tension element is an endless peripheral strand which extends across each upper portion of the walls.

* * * * *